(12) United States Patent
Kishimoto

(10) Patent No.: US 10,422,710 B2
(45) Date of Patent: Sep. 24, 2019

(54) SEMICONDUCTOR DIFFERENTIAL PRESSURE SENSOR

(71) Applicant: Mitsubishi Electric Corporation, Tokyo (JP)

(72) Inventor: Hiroyuki Kishimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 149 days.

(21) Appl. No.: 15/640,948

(22) Filed: Jul. 3, 2017

(65) Prior Publication Data

US 2018/0252606 A1 Sep. 6, 2018

(30) Foreign Application Priority Data

Mar. 3, 2017 (JP) ................. 2017-040054

(51) Int. Cl.
| | | |
|---|---|---|
| *G01L 7/08* | (2006.01) | |
| *G01L 9/00* | (2006.01) | |
| *G01L 19/00* | (2006.01) | |
| *G01L 19/06* | (2006.01) | |
| *G01L 19/14* | (2006.01) | |
| *G01L 9/04* | (2006.01) | |
| *G01L 13/02* | (2006.01) | |
| *G01L 15/00* | (2006.01) | |

(52) U.S. Cl.
CPC ............ *G01L 9/0054* (2013.01); *G01L 9/045* (2013.01); *G01L 13/025* (2013.01); *G01L 15/00* (2013.01)

(58) Field of Classification Search
CPC ..... G01L 7/00; G01L 7/08; G01L 9/00; G01L 9/0054; G01L 9/045; G01L 13/00; G01L 13/025; G01L 15/00; G01L 19/00; G01L 19/04; G01L 19/06; G01L 19/14

See application file for complete search history.

(56) References Cited

U.S. PATENT DOCUMENTS

| 7,647,835 B2 * | 1/2010 | Speldrich .............. G01L 19/146 73/754 |
|---|---|---|
| 8,022,806 B2 * | 9/2011 | Nishimura ............ G01L 19/143 338/42 |
| 9,891,124 B2 * | 2/2018 | Suzuki .................. G01L 9/0044 |
| 2006/0164203 A1 * | 7/2006 | Mast ..................... G01L 19/003 338/68 |

(Continued)

FOREIGN PATENT DOCUMENTS

| JP | 2004-163148 A | 6/2004 | |
|---|---|---|---|
| JP | 2006145468 A * | 6/2006 | |
| JP | 2009052988 A * | 3/2009 | ......... G01L 19/0038 |

*Primary Examiner* — Nguyen Q. Ha
(74) *Attorney, Agent, or Firm* — Sughrue Mion, PLLC; Richard C. Turner

(57) ABSTRACT

A semiconductor differential pressure sensor includes a pressure detection element, which is arranged such that its main surface is fixed on a top of a first protrusion with an adhesive while a second protrusion is fitted into its opening. Thus, the pressure detection element is held with high holding power at an exact position. Moreover, the adhesive does not flow into a first pressure introducing path, whereby blocking of the first pressure introducing path is prevented. Furthermore, by providing a recess around the first protrusion, influence of thermal deformation of a resin package on pressure detection characteristics is decreased.

12 Claims, 3 Drawing Sheets

(56) References Cited

U.S. PATENT DOCUMENTS

| | | | |
|---|---|---|---|
| 2011/0138924 A1* | 6/2011 | Colombo | G01L 19/0092 |
| | | | 73/756 |
| 2016/0076960 A1* | 3/2016 | Sato | B21K 21/12 |
| | | | 73/723 |
| 2018/0313711 A1* | 11/2018 | Sixtensson | G01L 19/145 |

* cited by examiner

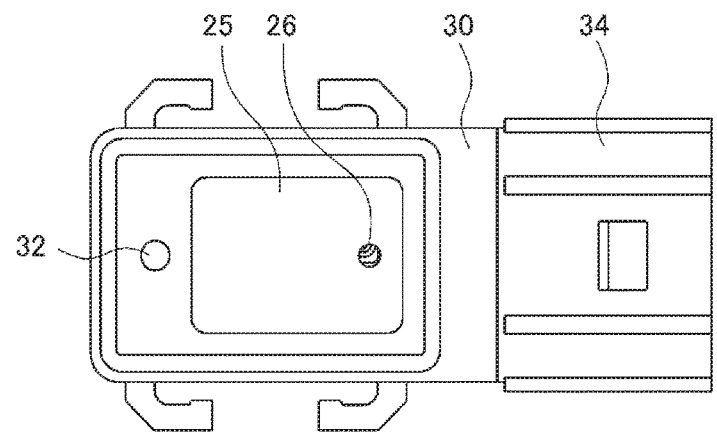
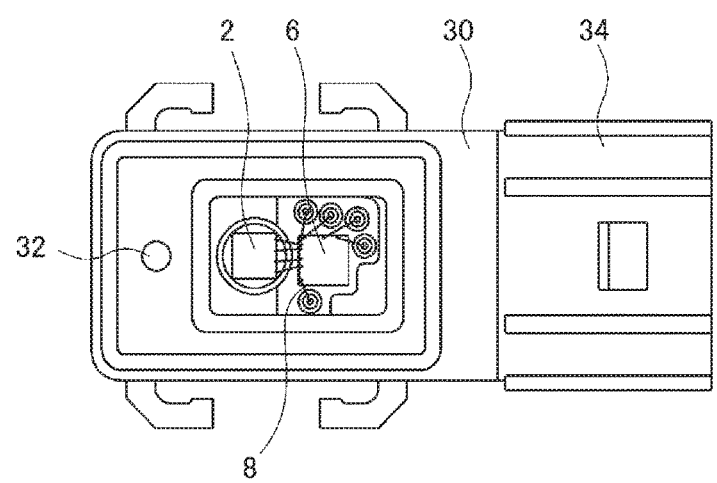
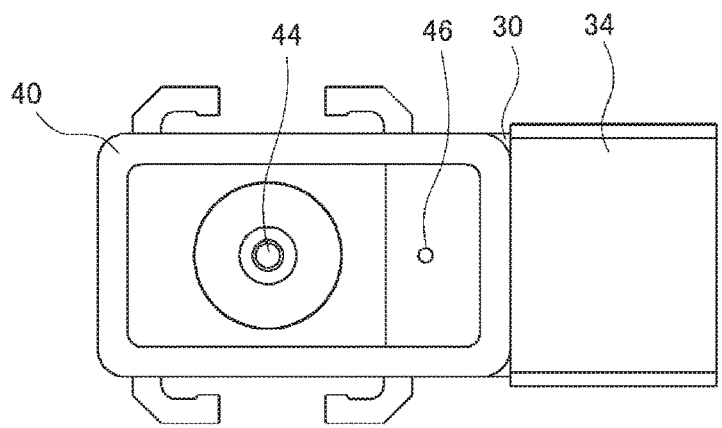

SEMICONDUCTOR DIFFERENTIAL PRESSURE SENSOR

BACKGROUND OF THE INVENTION

Field of the Invention

The present invention relates to a semiconductor differential pressure sensor that detects a difference between atmospheric pressure and pressure of a measured medium.

Description of the Background Art

Semiconductor differential pressure sensors including a pressure detection element for detecting a difference of pressure of a measured medium from atmospheric pressure have been known. The semiconductor differential pressure sensor is used by, for example, being mounted on a gasoline tank of an automobile to detect pressure variation of gasoline vapor in a fuel tank system.

The pressure detection element, which is included in the semiconductor differential pressure sensor, is formed by arranging a semiconductor piezoresistance, wiring, electrodes, and other components on a surface side of a single crystal silicon substrate, and the pressure detection element has a thin film diaphragm at a center part of the single crystal silicon substrate. The diaphragm is formed by opening a back surface side of the substrate by etching. The back surface side of the pressure detection element is adhesively fixed on a resin package, which has a pressure introducing hole, with an adhesive, such as a low rigidity silicone resin. The pressure detection element thus constructed can, for example, detect atmospheric pressure at the surface side and detect pressure of a measured medium at the back surface side that is opened.

To make the semiconductor differential pressure sensor function as expected, the pressure detection element must be held without peeling off from the resin package due to a difference between pressures that are applied on a surface and a back surface of the diaphragm. On the other hand, when the resin package of a conventional semiconductor differential pressure sensor expands or shrinks due to environmental temperature variation, the generated thermal strain can directly propagate to the pressure detection element and can affect pressure detection characteristics.

Regarding this problem, for example, Patent Document 1 discloses a technique of interposing a ceramic substrate between a resin package and a pressure detection element. The ceramic substrate has a thermal expansion coefficient near to that of a silicon material of the pressure detection element. This structure reduces strain of the diaphragm of the pressure detection element when the resin package is thermally deformed, because the ceramic substrate releases the thermal stress of the resin package.

[Patent Document 1] JP-A-2004-163148

As described above, the assembly structure of the semiconductor differential pressure sensor must be configured so that the pressure detection element is strongly adhesively fixed to the resin package and so as to reduce strain of the diaphragm due to thermal deformation of the resin package. In particular, the back surface side of the pressure detection element is opened and thus has a small adhering area with respect to the resin package, which can cause peeling off of the pressure detection element when the pressure detection element receives high pressure from a pressure introducing path.

Moreover, there may be cases in which an adhesive that is coated on the resin package flows into and blocks the pressure introducing path in die bonding of the pressure detection element to the resin package, thereby reducing reliability of the pressure detection. Furthermore, curing the adhesive at a high temperature decreases the viscosity and increases the fluidity of the adhesive, and therefore, the pressure detection element may be shifted from an original die bonding position, whereby a load may be applied to a wire that is connected to the pressure detection element.

According to Patent Document 1, the ceramic substrate is interposed between the resin package and the pressure detection element to decrease the effect of the thermal deformation of the resin package on the pressure detection characteristics. This structure increases part cost and production cost.

SUMMARY OF THE INVENTION

The present invention has been completed to solve these problems, and an object of the invention is to provide a semiconductor differential pressure sensor that is configured to hold a pressure detection element with high holding power at an exact position and to prevent blocking of a pressure introducing path of a resin package as well as suppress influence of thermal deformation of the resin package on pressure detection characteristics and that is produced at a low cost with a high yield.

A semiconductor differential pressure sensor relating to the invention includes a pressure sensor module that has a pressure detection element and a resin package. The pressure detection element has one main surface to which atmospheric pressure is to be introduced and has the other main surface that is provided with an opening to which pressure of a measured medium is to be introduced. The resin package has a pressure reference chamber in which the pressure detection element is placed. The resin package has a first protrusion, which has a flat top with an area larger than the area of the other main surface of the pressure detection element, and has a second protrusion, which is provided at a center part of the top so that the first protrusion and the second protrusion are on the same axis and in the same direction. A first pressure introducing path penetrates through an inside of the first protrusion and the second protrusion in the axial direction and thereby communicates with the opening. The pressure detection element is arranged such that the other main surface is fixed on the top of the first protrusion with an adhesive while the second protrusion is fitted into the opening.

The semiconductor differential pressure sensor relating to the invention has the pressure detection element, which is arranged such that the other main surface is fixed on the top of the first protrusion with the adhesive while the second protrusion is fitted into the opening. Thus, the pressure detection element is strongly held with high holding power at the exact position, and the adhesive does not flow into the first pressure introducing path, whereby blocking of the first pressure introducing path is prevented. Moreover, the pressure detection element is fixed on the top of the first protrusion, whereby transmission of deflection due to thermal deformation of the resin package to the pressure detection element is suppressed without using a conventional ceramic substrate. Accordingly, influence of the thermal deformation of the resin package on the pressure detection characteristics is decreased, and the semiconductor differential pressure sensor is produced at a low cost with a high yield.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a top view showing the semiconductor differential pressure sensor relating to the first embodiment of the invention, in which a second cover is removed.

FIG. 4 is a top view showing the semiconductor differential pressure sensor relating to the first embodiment of the invention, in which the second cover and a first cover are removed.

FIG. 5 is a bottom view showing the semiconductor differential pressure sensor relating to the first embodiment of the invention.

DETAILED DESCRIPTION OF THE PREFERRED EMBODIMENTS

First Embodiment

Figure 1:
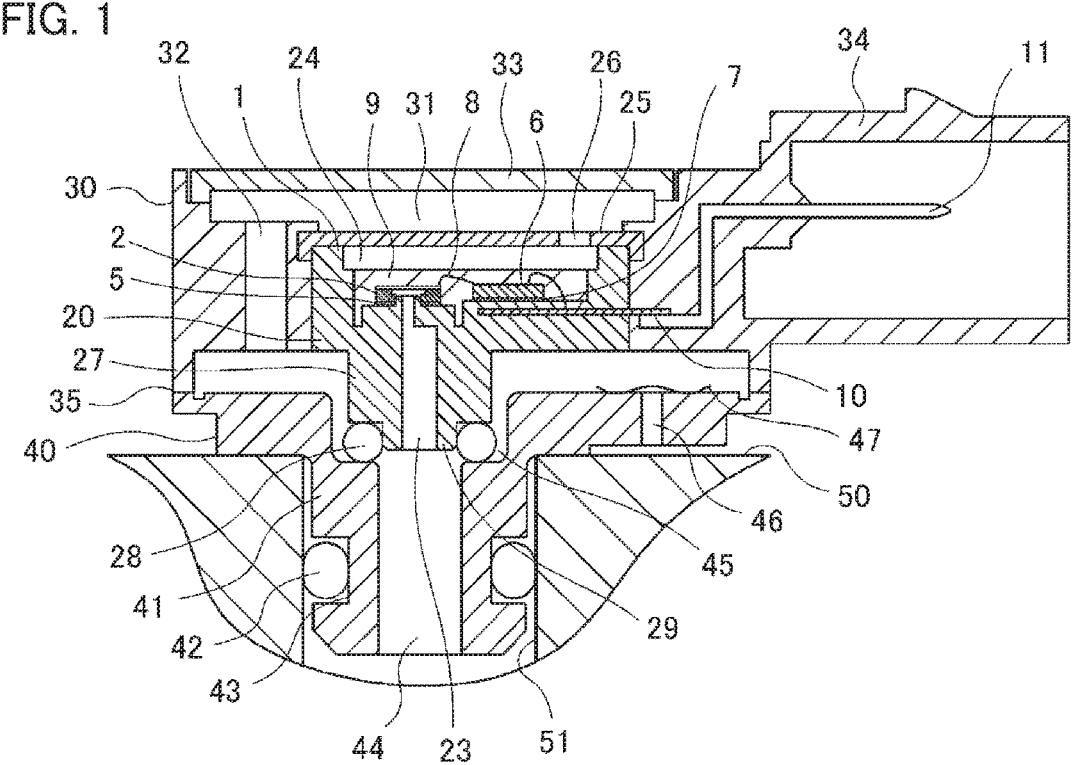
FIG. 1 is a sectional view showing a semiconductor differential pressure sensor relating to a first embodiment of the invention.
Figure 2:
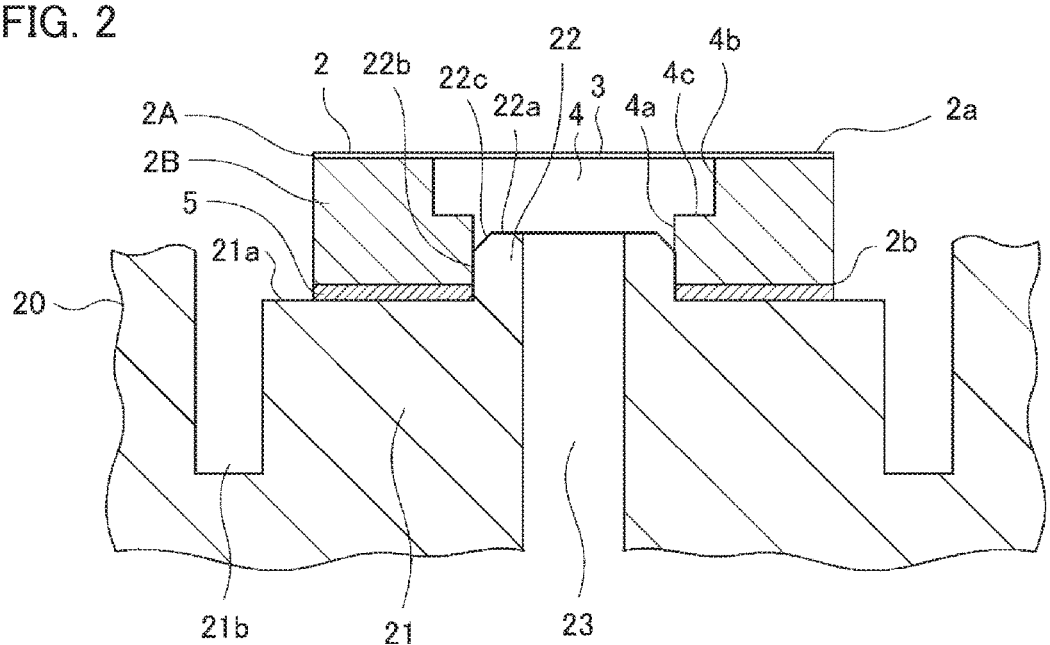
FIG. 2 is a sectional view showing a part of the semiconductor differential pressure sensor relating to the first embodiment of the invention.

Hereinafter, a semiconductor differential pressure sensor relating to a first embodiment of the invention will be described by referring to drawings. FIG. 1 is a sectional view showing the semiconductor differential pressure sensor relating to the first embodiment. FIG. 2 is a sectional view showing a part of the semiconductor differential pressure sensor relating to the first embodiment. It is noted that the same or corresponding parts are indicated by the same symbols in the drawings.

The semiconductor differential pressure sensor relating to the first embodiment detects pressure variation of gasoline vapor in a fuel tank system of an automobile and is mounted on an open hole 51, which is provided to a gasoline tank 50, as shown in FIG. 1. The insertion direction of the semiconductor differential pressure sensor into the open hole 51 is called as an "axial direction" in the following descriptions.

A pressure sensor module 1 includes a pressure detection element 2 and a resin package 20. The pressure detection element 2 has opposed main surfaces 2a and 2b. The resin package 20 has a pressure reference chamber 24 in which the pressure detection element 2 is placed. As shown in FIG. 2, the pressure detection element 2 includes a pressure element 2A and a base 2B. The pressure element 2A is constituted of a silicon substrate and has a thin film diaphragm 3, which is arranged at the center portion of the pressure element 2A, and an electric circuit (not shown), which includes a piezoresistance for detecting strain that occurs in the diaphragm 3. The base 2B has an opening 4 and is constituted of a glass, a silicon substrate, or other material, and the base 2B is bonded to the pressure element 2A by anodic bonding.

The pressure detection element 2 detects a pressure difference by using variation in the resistance value of the piezoresistance, and the resistance value of the piezoresistance varies in accordance with a deformation amount of the diaphragm 3. The diaphragm 3 deforms by a pressure difference between the main surface 2a, to which atmospheric pressure is introduced, and the opening 4 provided to the other main surface 2b, to which pressure of a measured medium is introduced. The pressure detection element 2 may include an electric circuit that is constituted of a capacitor instead of the electric circuit constituted of the piezoresistance.

The pressure detection element 2 is fixed on the resin package 20 with an adhesive 5, such as a low rigidity silicone resin. An amplitude adjusting circuit 6 is also fixed on the resin package 20 with an adhesive 7. The amplitude adjusting circuit 6 is constituted of an amplifier circuit, an adjusting circuit, a ROM (Read Only Memory), and other components. The amplifier circuit converts the pressure that is detected by the pressure detection element 2 into an electric signal and amplifies the electric signal. The adjusting circuit adjusts output voltage characteristics so as to be predetermined characteristics. The ROM stores adjusted data.

The pressure detection element 2 and the amplitude adjusting circuit 6 are connected to a lead frame 10 by a wire 8, which is made of gold or aluminum. The lead frame 10 is connected to an external connection terminal 11 by welding or soldering. Thus, the electric signal that is amplified and is adjusted by the amplitude adjusting circuit 6 is output to the outside via the external connection terminal 11. The pressure detection element 2, the amplitude adjusting circuit 6, and the wire 8 are covered with a protective material 9, such as fluorosilicone gel or fluorinated gel.

The resin package 20 of the pressure sensor module 1 is made of a thermosetting resin, such as an epoxy resin. The resin package 20 has the pressure reference chamber 24, in which the pressure detection element 2 is placed, and an end of the pressure reference chamber 24 is covered by a first cover 25, which is made of a thermoplastic resin. The first cover 25 has a first atmosphere introducing hole 26 for introducing atmospheric pressure into the pressure reference chamber 24. The number of the first atmosphere introducing hole 26 may be plural.

The resin package 20 also has a cylindrical part 27 at a side facing the pressure reference chamber 24 and has a cylindrical protrusion 29, to which an O ring 28 is fitted, at an end of the cylindrical part 27. The protrusion 29 has a chamfered shape at its end. A first pressure introducing path 23 that communicates with the opening 4 of the pressure detection element 2 is provided at the inside of the cylindrical part 27 and the protrusion 29.

The pressure sensor module 1 is contained in a resin housing 30, of which an outer peripheral part 35 is bonded to a case 40 by welding, bonding, or other bonding method. The housing 30, the case 40, and the first cover 25 are each made of a thermoplastic resin, such as a polybutyleneterephthalate resin (hereinafter called as a "PBT resin") or a polyphenylenesulfide resin (hereinafter called as a "PPS resin").

The housing 30 has a containing section 31 that contains the pressure sensor module 1, an atmosphere introducing path 32 that communicates with the containing section 31, a second cover 33 that covers an end of the containing section 31, and a connector 34 that is provided with the external connection terminal 11. The second cover 33 is bonded to the housing 30 by welding, bonding, or other bonding method. The connector 34 has a recessed shape, and an end of the external connection terminal 11 is exposed inside the connector 34. The connector 34 is to be attached to a female-side connector (not shown) that is connected to a vehicle control unit.

The housing 30 is integrally formed with the pressure sensor module 1 that is connected to the external connection terminal 11 via the lead frame 10, by insert molding using the PBT resin, the PPS resin, or other resin, while the first cover 25 is adhered to or is press fitted to the pressure sensor module 1. That is, the pressure sensor module 1 is integrally formed with the housing 30 without using an adhesive.

The case 40 has a cylindrical part 41, which is to be inserted into the open hole 51 of the gasoline tank 50 and be fixed, and has a groove 43 for fitting an O ring 42 to a circumferential surface of the cylindrical part 41. The O ring 42 prevents leakage of gasoline vapor and gasoline vapor pressure through a gap between an inner wall of the open hole 51 and the cylindrical part 41 to the outside.

A second pressure introducing path 44 that communicates with the opening 4 and the first pressure introducing path 23 of the pressure detection element 2 is provided at the inside of the cylindrical part 41. The case 40 and the housing 30 form a recessed shape sealing chamber 45 that is made air tight relative to the second pressure introducing path 44 by the O ring 28. The sealing chamber 45 is provided with a second atmosphere introducing hole 46 for introducing atmospheric pressure. The number of the second atmosphere introducing hole 46 may be plural. The second atmosphere introducing hole 46 is provided with a filter 47 that prevents entering of foreign matters, such as dust and water, from the outside into the housing 30.

FIGS. 3 and 4 are top views of the semiconductor differential pressure sensor relating to the first embodiment. FIG. 3 shows a condition in which the second cover is removed. FIG. 4 shows a condition in which the first cover is also removed in addition to the second cover. FIG. 5 is a bottom view of the semiconductor differential pressure sensor relating to the first embodiment. As shown in FIG. 3, when the second cover 33 is removed from the housing 30, the first cover 25 having the first atmosphere introducing hole 26 and covering the pressure reference chamber 24 of the pressure sensor module 1 is viewed. By further removing the first cover 25, the pressure detection element 2, the amplitude adjusting circuit 6, and the wire 8, which are covered with the protective material 9, are viewed as shown in FIG. 4.

On the other hand, the second pressure introducing path 44, through which the pressure of the measured medium is introduced, and the second atmosphere introducing hole 46, through which the atmospheric pressure is introduced, are open at the lower surface of the semiconductor differential pressure sensor. The atmospheric pressure is used as a measurement reference pressure and is introduced from the second atmosphere introducing hole 46, which is provided to the case 40, to the inside of the housing 30 via the filter 47. Then, the atmospheric pressure is introduced into the pressure reference chamber 24 via the first atmosphere introducing hole 26, which is provided to the first cover 25, through the atmosphere introducing path 32, which is formed in the housing 30.

The method of strongly fixing the pressure detection element 2 on the resin package 20 in the semiconductor differential pressure sensor relating to the first embodiment will be described by using FIG. 2. The opening 4 of the pressure detection element 2 has a first opening 4*a*, a second opening 4*b*, and a step 4*c* that is provided between the first opening 4*a* and the second opening 4*b*. The first opening 4*a* is provided at a side of the other main surface 2*b*, to which the pressure of the measured medium is introduced. The second opening 4*b* is provided closer to the main surface 2*a* than the first opening 4*a* and has an outside shape larger than that of the first opening 4*a*.

The resin package 20 has a first protrusion 21 and a second protrusion 22, which protrude in the axial direction, and has a ring-shaped recess 21*b*, which surrounds the first protrusion 21. The first protrusion 21 has a flat top 21*a* with an area larger than the area of the main surface 2*b* of the pressure detection element 2, and the second protrusion 22 is provided at a center part of the top 21*a* so that the first protrusion 21 and the second protrusion 22 are on the same axis and in the same direction. The second protrusion 22 has a circumferential surface 22*b* that is parallel to the axial direction and a second top 22*a* that orthogonally crosses the circumferential surface 22*b*. The second protrusion 22 has a chamfer 22*c* that is formed at an end of the second protrusion 22, and an outside shape of the second top 22*a* is smaller than that of the circumferential surface 22*b* as seen from the axial direction.

The first pressure introducing path 23, which communicates with the opening 4 of the pressure detection element 2, penetrates through the inside of the first protrusion 21 and the second protrusion 22 in the axial direction. The pressure detection element 2 is arranged such that the main surface 2*b* is fixed on the top 21*a* of the first protrusion 21 with the adhesive 5 while the second protrusion 22 is fitted into the opening 4. The inner circumferential surface of the first opening 4*a* and the circumferential surface 22*b* of the second protrusion 22 are fitted together with no gap in the first embodiment.

In the first embodiment, the cross sectional shape orthogonal to the axial direction of the opening 4 of the pressure detection element 2 is circular, and the first protrusion 21 and the second protrusion 22 each have a hollow cylindrical shape. In another example, the cross sectional shape of the opening 4 of the pressure detection element 2 may be square, and the first protrusion 21 and the second protrusion 22 each may be formed into a square pillar shape.

In the first embodiment, the pressure detection element 2 is arranged such that the main surface 2*b* is fixed on the top 21*a* of the first protrusion 21 with the adhesive 5 while the second protrusion 22 is fitted into the opening 4. Thus, the pressure detection element 2 is strongly held with high holding power, whereby peeling off of the pressure detection element 2 is prevented even when a high pressure is introduced from the first pressure introducing path 23 into the inside of the opening 4. Moreover, the pressure detection element 2 is fixed at the exact position without being displaced, and the adhesive 5 does not flow into the first pressure introducing path 23, whereby blocking of the first pressure introducing path 23 is prevented.

By providing the ring-shaped recess 21*b* around the first protrusion 21, of which the top 21*a* holds the pressure detection element 2, deflection due to thermal deformation of the resin package 20 is absorbed and is prevented from transmitting to the pressure detection element 2. Thus, the influence of the thermal deformation of the resin package 20 on the pressure detection characteristics is decreased without using a ceramic substrate, which is arranged between the resin package and the pressure detection element in a related art. Furthermore, the pressure sensor module 1 is integrally formed with the housing 30 without using an adhesive, whereby a device including the pressure sensor module 1 is reduced in dimensions and cost and is produced at a high efficiency.

Accordingly, the first embodiment provides a semiconductor differential pressure sensor that is configured to hold the pressure detection element 2 with high holding power at the exact position and to prevent blocking of the first pressure introducing path 23 of the resin package 20 as well as suppress influence of thermal deformation of the resin package 20 on the pressure detection characteristics. This semiconductor differential pressure sensor is produced at a low cost with a high yield.

Second Embodiment

Figure 6:
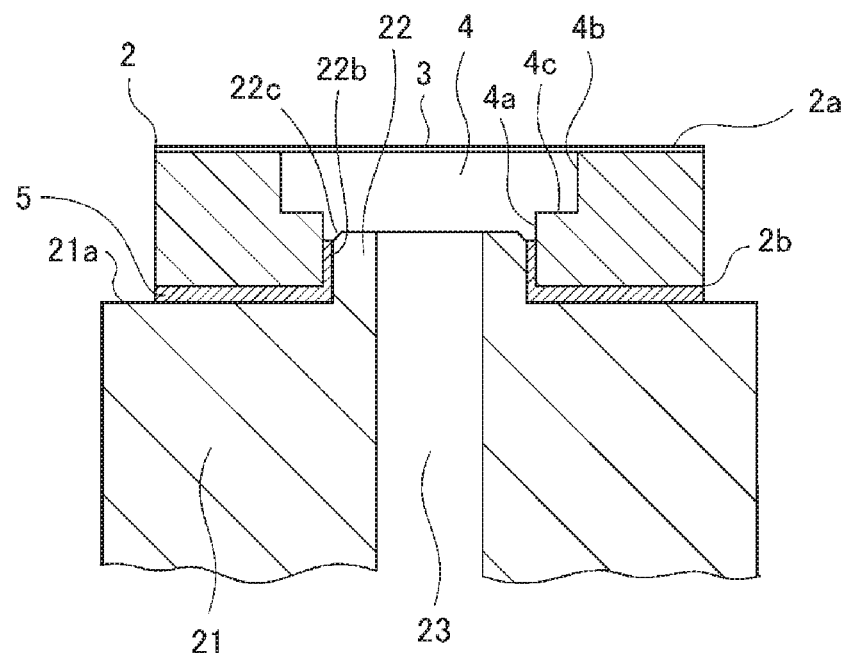
FIG. 6 is a sectional view showing a part of a semiconductor differential pressure sensor relating to a second embodiment of the invention.

FIG. 6 is a sectional view showing a part of a semiconductor differential pressure sensor relating to a second embodiment of the invention. The overall structure of the semiconductor differential pressure sensor relating to the second embodiment is similar to that of the first embodiment, and therefore, the overall structure of the semiconductor differential pressure sensor relating to the second embodiment will be described by using FIG. 1 and will not be described in detail.

In the first embodiment, the second protrusion 22, which is provided to the resin package 20, is arranged such that the circumferential surface 22b parallel to the axial direction is fitted to the inner circumferential surface of the opening 4 of the pressure detection element 2 with no gap, as shown in FIG. 2. On the other hand, in the second embodiment, the outside dimension of the circumferential surface 22b of the second protrusion 22 is made slightly smaller than that of the opening 4 of the pressure detection element 2. Thus, die bonding is performed while the second protrusion 22 and the opening 4 have a space therebetween. The adhesive 5 flows into the space and thereby fixes the circumferential surface 22b of the second protrusion 22 to the inner circumferential surface of the opening 4. The end of the second protrusion 22 having the chamfered shape prevents creeping up of the adhesive 5 at the start point of the chamfer 22c. The other structural components except for the second protrusion 22 are similar to those used in the first embodiment.

The second embodiment provides effects similar to those of the first embodiment as well as improves the power of holding the pressure detection element 2 because the adhering area between the pressure detection element 2 and the resin package 20 is larger than that in the first embodiment.

Third Embodiment

Figure 7:
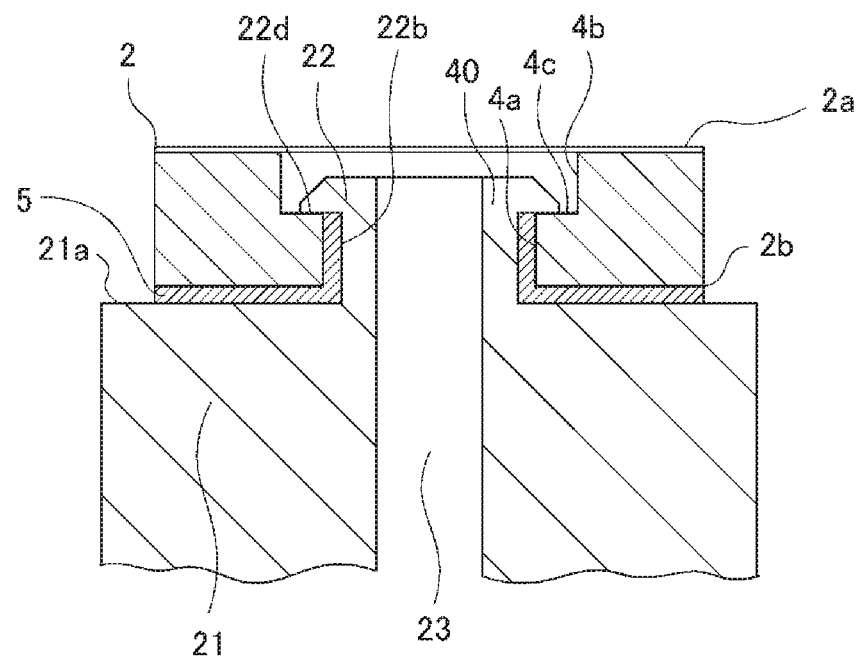
FIG. 7 is a sectional view showing a part of a semiconductor differential pressure sensor relating to a third embodiment of the invention.

FIG. 7 is a sectional view showing a part of a semiconductor differential pressure sensor relating to a third embodiment of the invention. The overall structure of the semiconductor differential pressure sensor relating to the third embodiment is similar to that of the first embodiment, and therefore, the overall structure of the semiconductor differential pressure sensor relating to the third embodiment will be described by using FIG. 1 and will not be described in detail.

In the third embodiment, the outside dimension of the circumferential surface 22b of the second protrusion 22 is made slightly smaller than that of the opening 4 of the pressure detection element 2, which is similar to that in the second embodiment. Thus, die bonding is performed while the second protrusion 22 and the opening 4 have a space therebetween. As a result, the circumferential surface 22b of the second protrusion 22 is fixed to the inner circumferential surface of the opening 4 with the adhesive 5.

Moreover, the second protrusion 22 has a claw 22d that is formed by outwardly bending an end of the circumferential surface 22b, which is parallel to the axial direction. The second protrusion 22 is fitted into the first opening 4a while the claw 22d is fitted to the step 4c of the opening 4. In the example shown in FIG. 7, the claw 22d is orthogonally crosses the circumferential surface 22b and has an L-shaped cross section. The claw 22d has a chamfer shape at its end and thus does not have an acute angle. It is noted that the shape of the claw 22d is not limited to the shape described above. The other structural components except for the second protrusion 22 are similar to those used in the first embodiment.

The third embodiment provides effects similar to those of the first embodiment and the second embodiment and further improves the power of holding the pressure detection element 2 because the adhering area between the pressure detection element 2 and the resin package 20 is larger than that in the second embodiment. Moreover, even when a high pressure is introduced from the first pressure introducing path 23 into the inside of the opening 4, the claw 22d cancels the force that acts in a direction of peeling off the pressure detection element 2, thereby preventing peeling off of the pressure detection element 2.

Furthermore, the claw 22d prevents creeping up of the adhesive 5, thereby further effectively preventing blocking of the first pressure introducing path 23. By providing the claw 22d at the second protrusion 22, displacement of the pressure detection element 2 in the axial direction is regulated, and the position precision is further improved. Various modifications and alterations of this invention will be apparent to those skilled in the art without departing from the scope and spirit of this invention, and it should be understood that this is not limited to the illustrative embodiments set forth herein.

What is claimed is:

1. A semiconductor differential pressure sensor comprising:
    a pressure sensor module including a pressure detection element and a resin package,
    the pressure detection element having one main surface to which atmospheric pressure is to be introduced and having the other main surface that is provided with an opening to which pressure of a measured medium is to be introduced, and
    the resin package having a pressure reference chamber in which the pressure detection element is placed,
    wherein the resin package has a first protrusion, which has a flat top with an area larger than the area of the other main surface of the pressure detection element, and a second protrusion, which is provided at a center part of the top so that the first protrusion and the second protrusion are on the same axis and in the same direction,
    a first pressure introducing path penetrates through an inside of the first protrusion and the second protrusion in the axial direction and thereby communicates with the opening, and
    the pressure detection element is arranged such that the other main surface is fixed on the top of the first protrusion with an adhesive while the second protrusion is fitted into the opening,
    wherein the second protrusion has a surface that is parallel to the axial direction and which is fitted to a surface of the opening that is parallel to the axial direction.

2. The semiconductor differential pressure sensor according to claim 1, wherein the surface of the second protrusion is a circumferential surface that is parallel to the axial direction and the surface of the opening is an inner circumferential surface, and the circumferential surface is fitted to the inner circumferential surface of the opening of the pressure detection element with no gap.

3. The semiconductor differential pressure sensor according to claim 1, wherein the surface of the second protrusion is a circumferential surface that is parallel to the axial direction and the surface of the opening is an inner circumferential surface, and the circumferential surface is fixed to the inner circumferential surface of the opening of the pressure detection element with the adhesive.

4. The semiconductor differential pressure sensor according to claim 1, wherein the first protrusion and the second protrusion each have a hollow cylindrical shape.

5. The semiconductor differential pressure sensor according to claim 1, wherein the resin package has a recess that surrounds the first protrusion.

6. The semiconductor differential pressure sensor according to claim 1, further comprising:
a cover having a first atmosphere introducing hole and covering an end of the pressure reference chamber;
a housing; and
a case, the housing and the case each made of resin and bonded to each other,
wherein the housing has a containing section that contains the pressure sensor module, an atmosphere introducing path that communicates with the containing section, and a connector that is provided with an external connection terminal,
the case has a second pressure introducing path that communicates with the opening and the first pressure introducing path, and a second atmosphere introducing hole for introducing atmospheric pressure to the atmosphere introducing path, and
the atmospheric pressure is introduced into the pressure reference chamber through the second atmosphere introducing hole, the atmosphere introducing path and the first atmosphere introducing hole.

7. The semiconductor differential pressure sensor according to claim 6, wherein the pressure sensor module is integrally formed with the housing in conjunction with the cover while the pressure sensor module is connected with the external connection terminal via a lead frame.

8. The semiconductor differential pressure sensor according to claim 6, wherein the housing, the case, and the cover are each made of a thermoplastic resin.

9. The semiconductor differential pressure sensor according to claim 1, wherein the resin package is made of a thermosetting resin.

10. A semiconductor differential pressure sensor comprising:
a pressure sensor module including a pressure detection element and a resin package,
the pressure detection element having one main surface to which atmospheric pressure is to be introduced and having the other main surface that is provided with an opening to which pressure of a measured medium is to be introduced, and
the resin package having a pressure reference chamber in which the pressure detection element is placed,
wherein the resin package has a first protrusion, which has a flat top with an area larger than the area of the other main surface of the pressure detection element, and a second protrusion, which is provided at a center part of the top so that the first protrusion and the second protrusion are on the same axis and in the same direction,
a first pressure introducing path penetrates through an inside of the first protrusion and the second protrusion in the axial direction and thereby communicates with the opening, and
the pressure detection element is arranged such that the other main surface is fixed on the top of the first protrusion with an adhesive while the second protrusion is fitted into the opening, wherein the second protrusion has a circumferential surface that is parallel to the axial direction and has a second top that orthogonally crosses the circumferential surface, and the outside shape of the second top is smaller than the outside shape of the circumferential surface as seen from the axial direction.

11. A semiconductor differential pressure sensor comprising:
a pressure sensor module including a pressure detection element and a resin package,
the pressure detection element having one main surface to which atmospheric pressure is to be introduced and having the other main surface that is provided with an opening to which pressure of a measured medium is to be introduced, and
the resin package having a pressure reference chamber in which the pressure detection element is placed,
wherein the resin package has a first protrusion, which has a flat top with an area larger than the area of the other main surface of the pressure detection element, and a second protrusion, which is provided at a center part of the top so that the first protrusion and the second protrusion are on the same axis and in the same direction,
a first pressure introducing path penetrates through an inside of the first protrusion and the second protrusion in the axial direction and thereby communicates with the opening, and
the pressure detection element is arranged such that the other main surface is fixed on the top of the first protrusion with an adhesive while the second protrusion is fitted into the opening,
wherein the opening has a first opening, a second opening, and a step that is provided between the first opening and the second opening, the first opening is provided at a side of the other main surface, the second opening is provided closer to the main surface than the first opening and has an outside shape larger than the outside shape of the first opening,
the second protrusion has a claw that is formed by outwardly bending an end of a circumferential surface, which is parallel to the axial direction, and the second protrusion is fitted into the first opening while the claw is fitted to the step.

12. The semiconductor differential pressure sensor according to claim 11, wherein the claw orthogonally crosses the circumferential surface.

* * * * *